June 27, 1939.  G. F. HOUSTON ET AL  2,163,880
GEAR SHIFTING MECHANISM
Filed Feb. 5, 1936   7 Sheets-Sheet 3
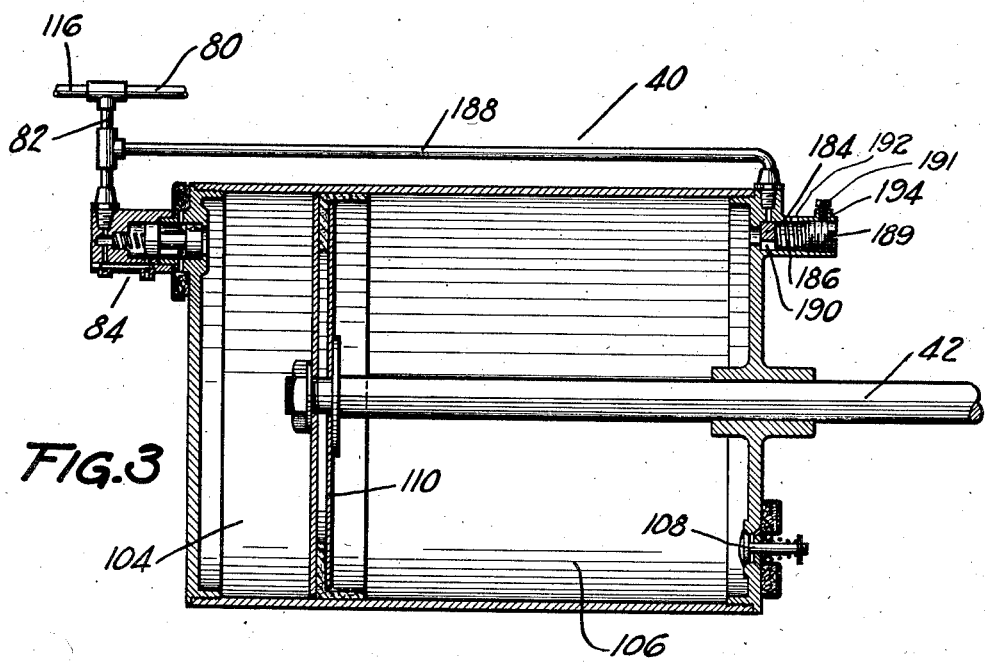
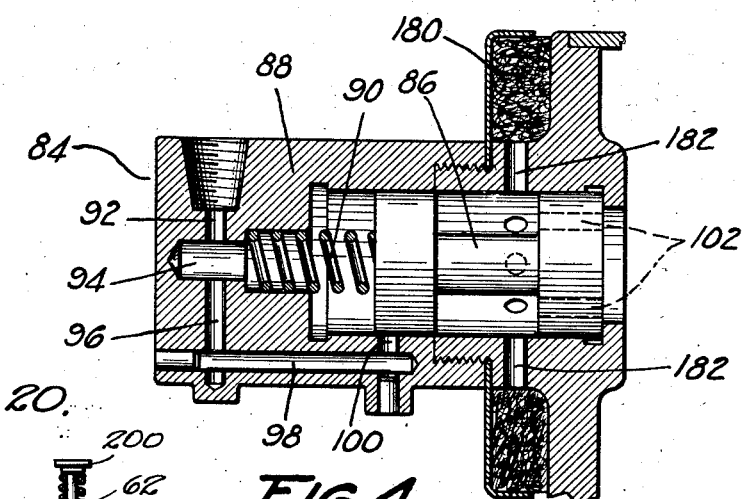
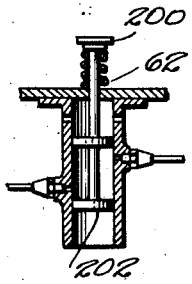
INVENTOR.
GEORGE F. HOUSTON
ROY S. SANFORD
BY
ATTORNEY

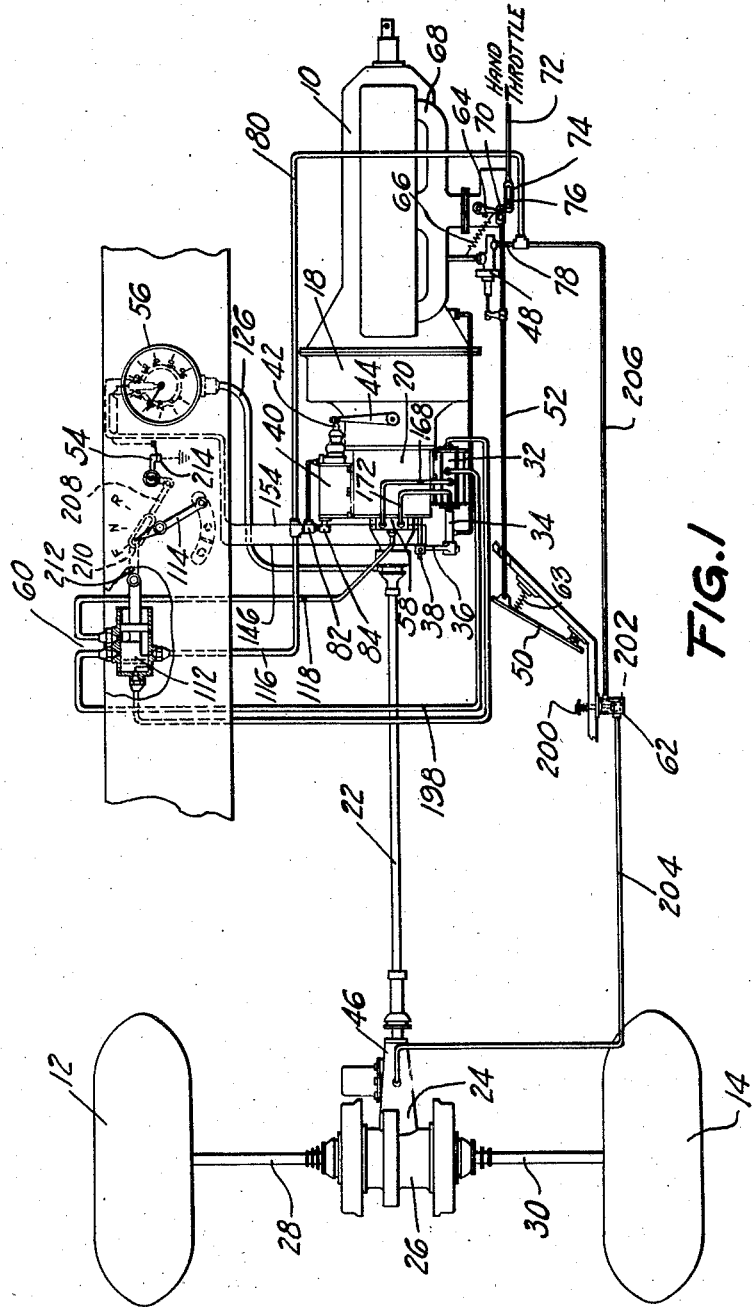

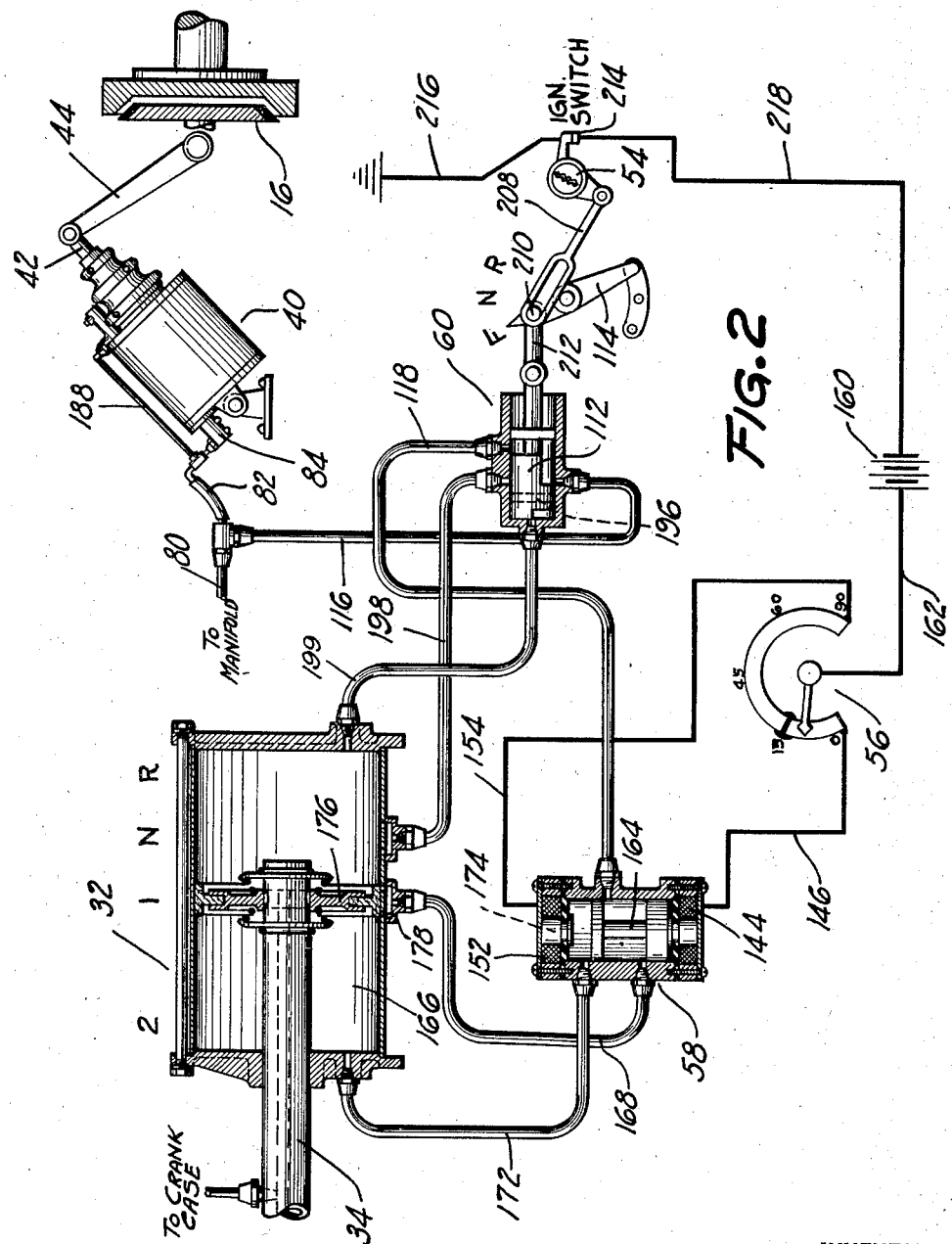

INVENTOR.
GEORGE F. HOUSTON
ROY S. SANFORD
BY
ATTORNEY

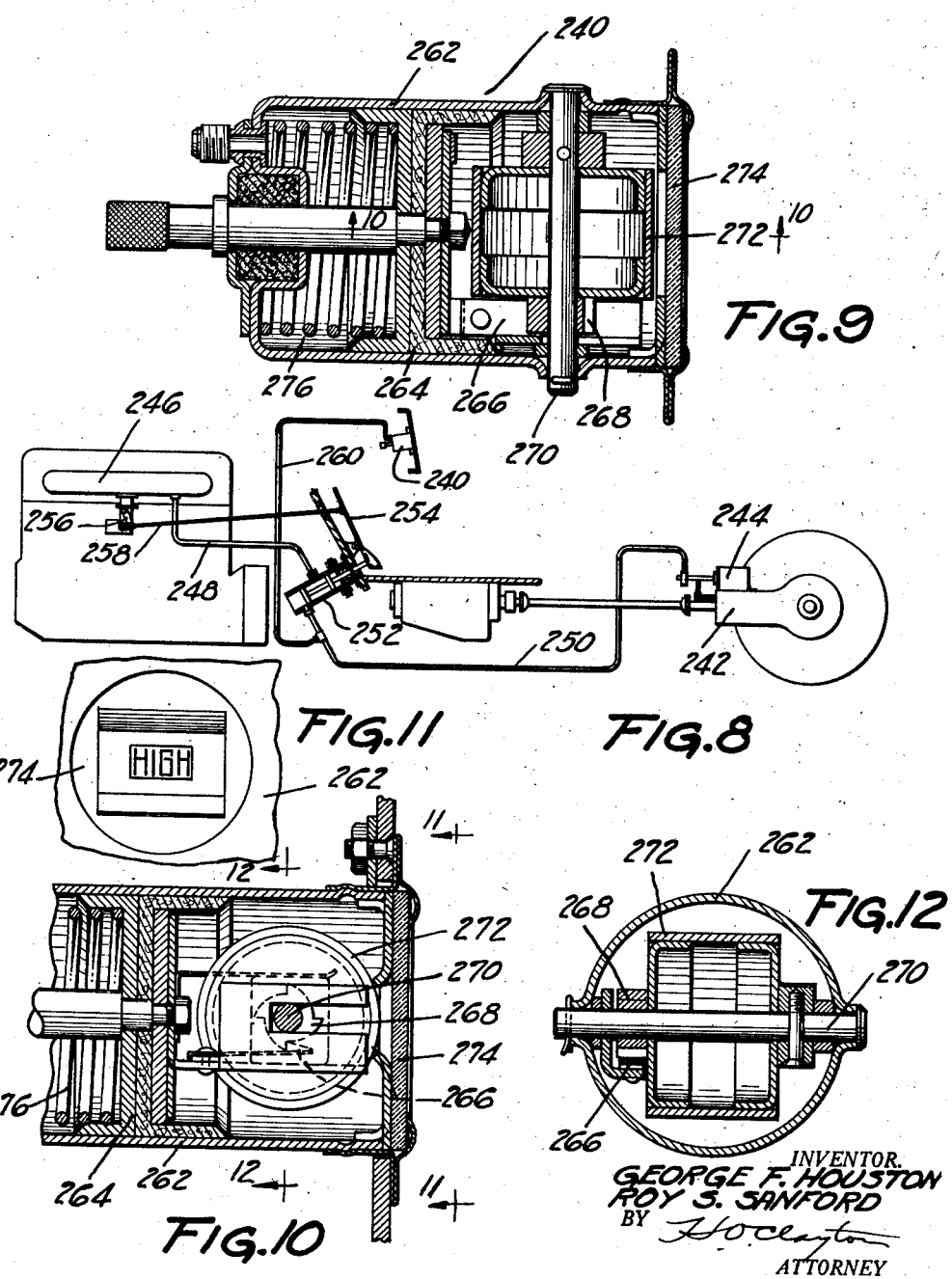

June 27, 1939.  G. F. HOUSTON ET AL  2,163,880
GEAR SHIFTING MECHANISM
Filed Feb. 5, 1936  7 Sheets-Sheet 6

INVENTOR.
GEORGE F. HOUSTON
ROY S. SANFORD
BY
ATTORNEY

June 27, 1939.   G. F. HOUSTON ET AL   2,163,880
GEAR SHIFTING MECHANISM
Filed Feb. 5, 1936   7 Sheets-Sheet 7
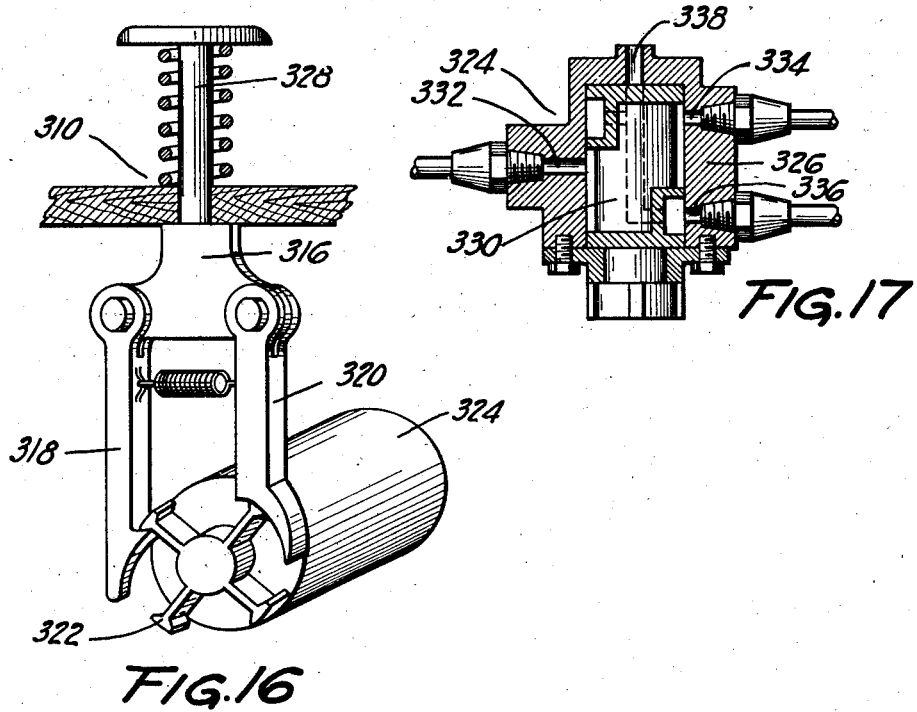
FIG.16
FIG.17
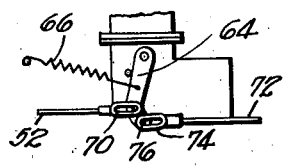
FIG.18.
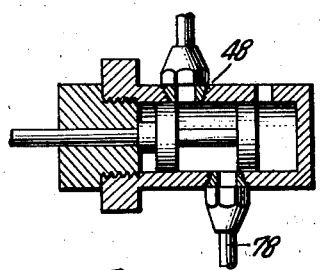
FIG.19.
INVENTOR.
GEORGE F. HOUSTON
ROY S. SANFORD
BY
ATTORNEY Patented June 27, 1939

2,163,880

UNITED STATES PATENT OFFICE 2,163,880

GEAR SHIFTING MECHANISM

George F. Houston, Hamilton, Ohio, and Roy S. Sanford, New York, N. Y., assignors to Bendix Products Corporation, South Bend, Ind., a corporation of Indiana Application February 5, 1936, Serial No. 62,466

10 Claims. (Cl. 192—.01)

This invention relates to power means for operating the clutch and/or change-speed transmission or transmissions of an automotive vehicle.

It is the principal object of the invention to provide an efficient and effective control mechanism for the aforementioned power means, said mechanism to include the ignition system of the vehicle and the accelerator or other carburetor control means.

A further object of the invention is to so interlock the power means for operating the aforementioned clutch and transmissions as to insure the operation of the clutch prior to an operation of the transmissions.

Yet another object is to so simplify the controls of the aforementioned power plant that the clutch pedal and gear shift lever may be dispensed with, the manually operated elements of said controls being limited to the accelerator, a manually operated member for initiating the operations of a dual ratio transmission unit, and a selector operable to determine whether the car is to be moved forwardly or rearwardly.

A further object of the invention is to provide, in an automotive vehicle, pressure differential operated power means for operating the clutch and a plurality of change-speed transmission units, said power means being operable only when the accelerator is released.

The invention further contemplates the provision of a transmission operating power means controlled in part by a vehicle operated speed responsive mechanism, whereby the transmission is operated in accordance with the speed of the vehicle.

Yet another object of the invention is to provide two change-speed transmission mechanisms operable in timed relation with the operation of a clutch, one of said transmissions being manually controlled and the other of said transmissions being in part automatically controlled.

A further object is to provide selective gear transmission mechanisms for an automotive vehicle, whereby four different gear ratios are provided for forward driving.

Other objects of the invention and desirable features, including a clutch control mechanism automatically compensating for clutch wear, a simple and effective combined speedometer and governor means for controlling a change-speed transmission, and other mechanisms and combinations of parts, will be made apparent from the following detailed description of preferred embodiments of the invention, taken in conjunction with the accompanying drawings, in which:

Figure 1 is a plan view of a preferred embodiment of clutch and transmission operating mechanism constituting our invention;

Figure 2 is a diagrammatic layout of a part of the mechanism of Figure 1, the governor controlled transmission operating power means and interlocked clutch control being disclosed;

Figure 3 is a sectional view of the clutch operating motor of Figures 1 and 2;

Figure 4 is a sectional view of the power operated three-way clutch control valve incorporated in the motor disclosed in Figure 3;

Figure 7:
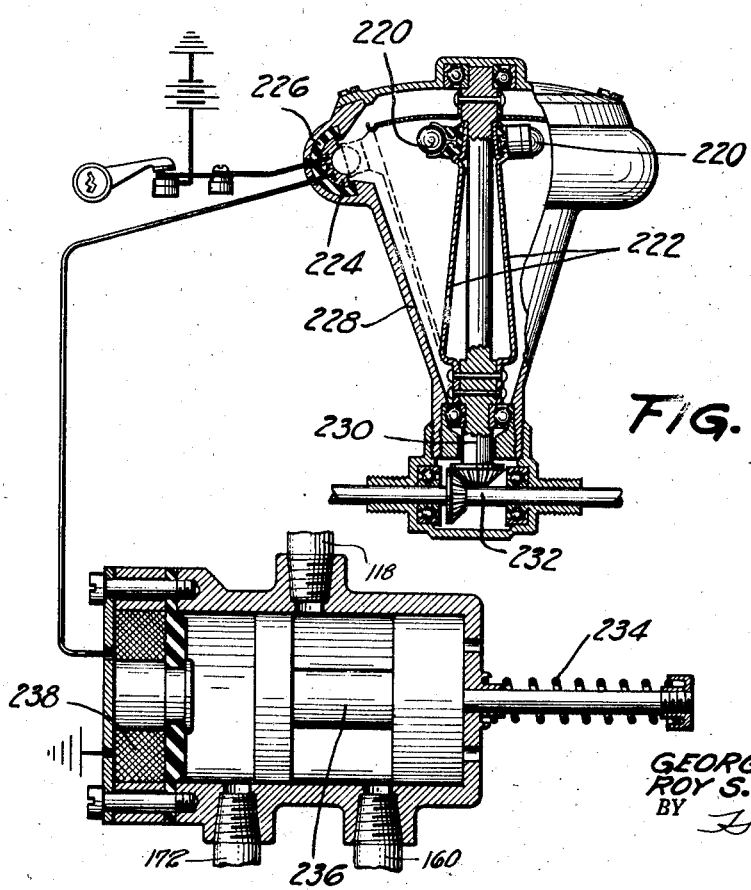
Figure 13:
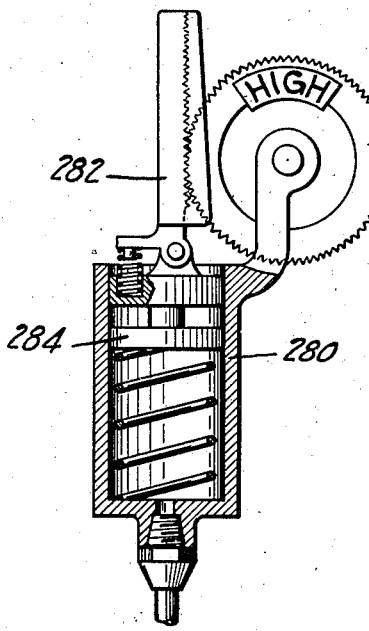
Figure 14:
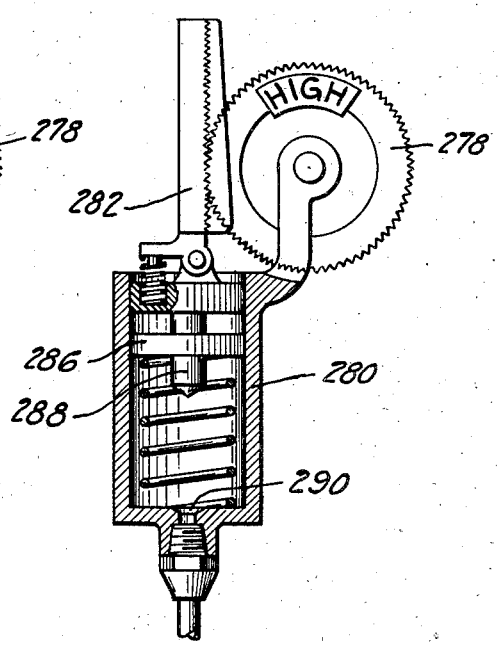
Figure 15:
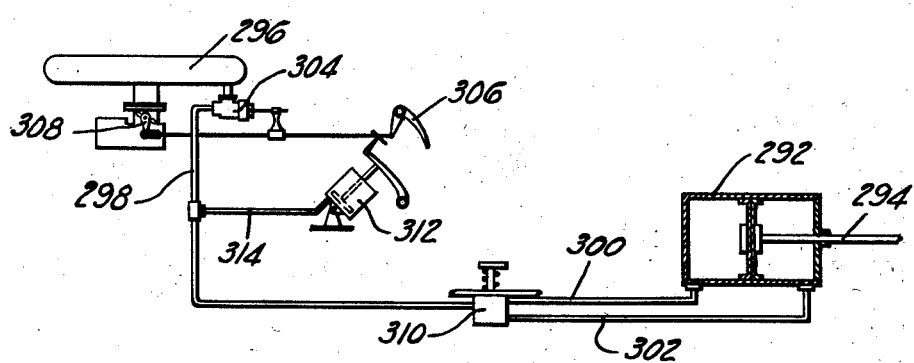

Figure 7 discloses, in section, an alternative type of governor mechanism and cooperating relay valve;

Figure 8 is a diagrammatic view of an alternative type of power mechanism for operating a dual ratio unit, a power operated telltale unit being incorporated in said mechanism;

Figure 9 is a sectional view of the telltale unit of the mechanism of Figure 8 together with the power means for operating said unit;

Figure 10 is a sectional view of the telltale unit, taken on the line 10—10 of Figure 9;

Figure 11 is a sectional view of the telltale unit, taken on the line 11—11 of Figure 10;

Figure 12 is a sectional view of the telltale unit, taken on the line 12—12 of Figure 10;

Figures 13 and 14 each disclose alternative forms of power operated telltale mechanism;

Figure 15 is a diagrammatic view of an alternative type of two-speed rear axle unit operating mechanism;

Figure 16 is a detailed view of the selector valve operating mechanism disclosed in Figure 15;

Figure 17 discloses the details of the double three-way selector valve unit of the mechanism of Figure 15;

Figure 18 is a detail view disclosing, in part, the throttle operating connections disclosed in Figure 1;

Figure 19 is a sectional view of the accelerator operated three-way valve disclosed in Figure 1; and Figure 20 is an enlarged view of the heel operated three-way valve shown in Figure 1.

There is disclosed in Figure 1 a preferred embodiment of our invention wherein an internal-combustion engine 10 provides a source of power to drive the rear wheels 12 and 14 of the vehicle, the transmission of power being effected by a conventional clutch 16, Figure 2, positioned to the rear of a flywheel housing 18, a two-speeds forward and reverse selective gear transmission 20, a propeller shaft 22, a conventional type of two-speed rear axle or so-called dual ratio unit 24, a conventional differential 26, and driving axles 28 and 30.

Our invention is directed broadly to power means for operating the aforementioned transmissions and clutch, and more particularly to the control means for said power means. The trend in the design of automotive vehicles is in part directed toward the simplification of the controls of the power plant, and to this end there is provided by our invention a mechanism dispensing with the use of both the clutch pedal and gear shift lever. In their stead the control of the clutch and transmissions is effected by the accelerator and the ignition switch in cooperation with simple forms of automatic and manually operable selector valve mechanisms.

As disclosed in Figure 1, a double-acting pressure differential operated motor 32, preferably secured to one side of the transmission housing, is operably connected to the two-speeds forward and reverse transmission 20 by means of a connecting rod 34 and cross head 36, the latter being secured to a single shifter rail 38 of the transmission. A double-ended clutch operating pressure differential operated motor 40 is preferably secured to the transmission housing opposite the transmission operating motor 32, the same being in part operably connected to the clutch 16 by a connecting rod 42 and crank arm 44. There is also disclosed a dual ratio operating pressure differential operated motor unit 46, which is not claimed herein, inasmuch as the same constitutes the invention of Roy S. Sanford et al., covered by Patent No. 1,994,835.

The aforementioned transmission and clutch operating motor units are controlled by valve and switch mechanism comprising a three-way valve 48, operated by an accelerator 50 connected to the valve by a throttle operating link 52; a switch 54 controlling the ignition system of the vehicle, a combined governor and speedometer mechanism 56, a relay valve mechanism 58, a hand operated selector valve 60, and a foot operated selector valve 62. The acceleration 50 is biased to its off position by a spring 63.

Describing now the operation of the invention, and incidentally the details of construction, upon practically completely releasing the accelerator 50, a throttle arm 64 is closed by a spring 66, thereby idling the engine and partially evacuating an intake manifold 68 to provide a vacuum power source. Complete release of the accelerator serves, by virtue of a lost motion connection 70, to operate the three-way valve 48 to interconnect and/or permit an interconnection of the motors 40, 32 and 46 with the intake manifold. There may also be provided a hand operated link 72 having a lost motion connection at 74 with a pin 76 secured to the throttle arm 64, thereby providing an alternative means for operating the throttle and the valve.

The fluid transmitting connection between the intake manifold and clutch motor comprises conduits 78, 80 and 82 and a power operated three-way relay valve 84, disclosed in detail in Figure 4. Upon connecting the motor 40 with the manifold as above described, a spool-shaped valve plunger 86, housed within a valve casing 88, is automatically drawn to the left, against the resistance of a spring 90, to provide the aforementioned vacuum circuit via ducts 92, 94, 96, 98 and 100 in the casing 88 and passages 102 in the plunger 86. A compartment 104 within the clutch motor 40 is thus evacuated, the remaining compartment 106 of the motor being at atmospheric pressure by virtue of a one-way valve 108 incorporated in one end wall of the motor. A piston 110 is thus forced to the left, Figure 3, to disengage the clutch.

Should the driver now desire to move the vehicle forwardly, a valve plunger member 112 of the selector valve 60 is moved, by an indexing lever 114, to the extreme left to the position disclosed in Figures 1 and 2 to thereby interconnect the governor controlled relay valve 58 with the intake manifold via conduits 116 and 118 and certain of the recessed portions of the plunger member 112.

Figure 5:
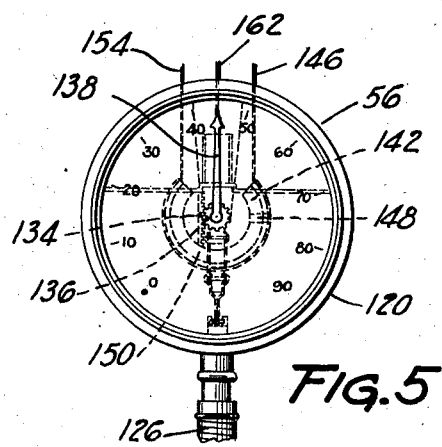
Figure 5 is an enlarged view of the combined speedometer and governor mechanism of Figure 1.
Figure 6:
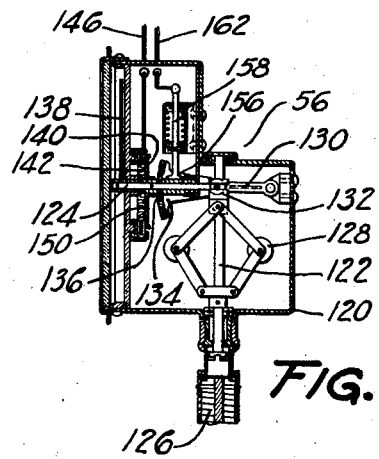
Figure 6 is a sectional view of the governor and speedometer mechanism of Figure 5, disclosing the details thereof.

The vehicle being at a standstill, the combined speedometer and governor control unit 56, disclosed in detail in Figures 5 and 6, functions to establish the low gear selection of the transmission 20, all as described below. Described in brief, the aforementioned unit comprises a casing 120 having right-angularly extending shafts 122 and 124 journaled therein, the former shaft being preferably drivably connected, by flexible driving means 126, with the propeller shaft 22 of the vehicle. A flyball governor mechanism 128 is mounted on the shaft 122, the rotation of the latter functioning to actuate the governor mechanism 128, which in turn imparts angular movement to a lever member 130 through the intermediary of a connection 132 slidably mounted on the shaft 122. To one end of the lever 130 is secured a rack 134 in mesh with a pinion 136 drivably secured to the shaft 124. Rotation of the shaft 124 serves both to effect angular movement of a pointer 138 to indicate the speed of the vehicle (or engine 10, if the unit 56 is driven by the engine) and to effect angular movement of a contact member 140 secured to the shaft 124. The member 140 slidably contacts a coiled wire contact member 142, the latter being connected to a solenoid 144 of relay valve unit 58 by a wire 146. When the speed of the vehicle exceeds, say, fifteen miles per hour, the contact member 140 passes over an insulator 148 and into contact with a second coiled wire contact member 150 connected to a second solenoid 152 of the valve unit 58 by a wire 154. The electrical connections are completed by a contact 156, urged into contact with the rotating shaft 124 by means of a spring operated biasing mechanism 158 and connected to a battery 160 by a wire 162.

We have assumed the vehicle to be at rest and the engine idling; therefore, the solenoid 144 is energized, as disclosed in Figure 2, to move a double three-way relay valve member 164 to interconnect the selector valve 60 with a compartment 166 of the transmission operating motor 32 via conduits 116 and 118 and a conduit 168. Compartment 166 is at the time connected to the atmosphere via a conduit 172 and a port 174 in the valve 58; however, the rate of evacuation of air therefrom exceeds the rate of ingress of air thereinto, resulting in a movement of a piston 176 from either its neutral or reverse gear positions to the position disclosed in Figure 2 to establish a low gear selection of the transmission: in this position of the piston a port 178 is covered.

Low gear having been established, the accelerator is then depressed, first closing valve 48 to vent the conduit 78 and all connected parts to atmosphere. With the closing of the valve 48, the relay valve plunger 86 in the clutch motor is actuated by spring 90 to move said member to the position disclosed in Figure 4. The compartment 104 of the clutch motor 40 is thus vented to the atmosphere via an air cleaner 180, a plurality of ducts 182 and the passages 102 in the valve member 86. The clutch motor is thus deenergized, whereupon the clutch springs function to engage the clutch, moving the piston 110 to the right, Figure 3. The first phase of the clutch engaging movement of the piston is relatively rapid, such movement, however, being automatically terminated, when the clutch plates contact at a predetermined load, by virtue of the operation of a spring loaded valve member 184. At said load the valve member 184 is actuated by a spring 186 to close the valve, thereby cutting off the vent of air from the compartment 106 via a conduit 188 connected with the manifold by conduits 80 and 82. The tension of the spring 186 is determined by a screw 189 held in its adjusted position by a set screw 191. After the valve 184 closes, the engagement of the clutch is completed at a relatively slow rate by virtue of a bleed of air from the compartment 106 via a slot 190 in valve 184 and a port 192 in a casing 194 for said member. There is thus provided a clutch operating power mechanism effecting a disengagement of the clutch upon release of the accelerator and an engagement thereof in two stages of movement upon depression of the accelerator.

With the engagement of the clutch and the opening of the throttle, the vehicle is moved forwardly in low gear. When the vehicle's speed exceeds the aforementioned fifteen mile per hour rate, the governor and speedometer unit 56 functions, as previously described, to energize the solenoid 152, thus actuating the relay valve member 164 to preselect a high gear operation of the transmission. Upon again releasing the accelerator, the clutch is again disengaged and the motor 32 energized to establish high gear, the piston 176 moving to the position marked "2" in Figure 2.

Should the operator desire to neutralize the transmission, the indexing or selector lever 114 is moved to the position marked "N" in Figures 1 and 2. With such operation, the selector valve 112 is moved to the right, Figure 2, to register a duct 196 with conduit 116 and with a conduit 198. Upon release of the accelerator, the connection with the manifold is again established and the motor 32 energized to effect a neutralizing operation of the transmission, the piston 176 moving to the position marked "N" in Figure 2. Should the operator desire to place the transmission in reverse gear, the selector lever is moved to the position marked "R" in Figures 1 and 2, whereupon conduits 116 and 199 are interconnected: release of the accelerator then energizes the motor 32 to complete the operation.

Referring now to the power means for operating the two-speed rear axle unit, depression of a button 200, which may be placed beneath the heel portion or conveniently near the accelerator 50, serves, by moving a spool-shaped valve plunger member 202 to the position disclosed in Figure 1, to interconnect the motor 46 with the manifold via conduits 204 and 206, valve 48 and conduit 78. Release of the accelerator then effects a transmission operation of the motor 46. The motor 46, which is disclosed, described and claimed in the aforementioned Patent No. 1,994,835, functions when energized to alternately establish one gear ratio, then the other; therefore, with each operation of the valve 62, one or the other of the two gear ratios of the transmission unit 24 is established.

Referring now to the interlock with the vehicle's ignition system, there is provided, as disclosed in Figures 1 and 2, the ignition switch 54, controlling said system. When the switch is closed, as disclosed in the figures, a link 208, having a lost motion connection with a pin 210 secured to the lever 114 and a valve rod 212, is moved to permit free movement of the lever 114 to all three of its selective positions. Furthermore, with the closing of the ignition switch 54, a switch 214 is closed, completing an electrical circuit, via wires 216, 218 and 162 and battery 160, to the governor unit 56, all as clearly disclosed in Figure 2. Upon opening the ignition switch, the switch 214 is broken, thereby obviating a drain upon the battery 160: said opening also serves to actuate link 208 to move the valve 112 and its connected selector lever 114 to their neutral positions. Thus upon turning off the ignition the transmission is automatically neutralized.

There is disclosed in Figure 7 an embodiment of governor mechanism and relay valve wherein ball bearing contact members 220, secured to and insulated from spring ribs 222, function, when a critical speed of the vehicle is reached, to make contact with conductor rings 224. Rings 224, which may be of brass, are housed within a supporting cage 226 of insulating material, such as Bakelite, said cage being housed within an aluminum or other suitable shell 228, preferably die cast over the cage. The spring ribs 222 are secured to a rotatable shaft 230 journaled within the shell 228, said shell being actuated by the propeller shaft of the vehicle by means including a shaft and gearing 232.

When the vehicle speed is below, say, fifteen miles per hour, a spring 234 functions to maintain a spool-shaped valve member 236 in the position disclosed in Figure 7, whereby a selector valve, for example that disclosed in Figure 2, is interconnected with a transmission operating motor to establish a low gear setting of the transmission. When the vehicle speed reaches the critical factor of fifteen miles per hour, the centrifugal force developed is such as to force the weights 220 into contact with the rings 224, completing an electrical circuit to a solenoid 238 to energize the same for drawing the valve 236 to the left to effect a high gear operation of the transmission.

There is disclosed in Figures 8 to 12 a so-called telltale mechanism 240 for indicating to the driver the established gear ratio of the two-speed rear axle unit. As disclosed in Figure 8, a unit 242 is arranged to be operated by a double-acting motor 244, the latter being in fluid transmitting connection with an intake manifold 246 by means of conduits 248 and 250 and a selector valve unit 252 interconnecting said conduits. The valve 252 is arranged to be operated by the heel portion of an accelerator 254, the latter being operatively connected to a throttle 256 by a link 258.

The aforementioned telltale mechanism 240 comprises a power operated unit in fluid transmitting connection with the conduit 250 by means of a conduit 260: thus with operation of the selector 252, the telltale is automatically operated, such operation being preferably effected just prior to an operation of the motor 244.

The details of the telltale unit are disclosed in Figures 9, 10 and 11, wherein a casing 262 houses a reciprocable spring loaded piston 264 operatively connected, by a pawl 266, with a ratchet 268, the latter being secured to a shaft 270 journaled in the casing 262. An indicator drum 272 is fixedly mounted upon the shaft 270 and is adapted, when rotated, to register either its "high" or "low" indicia with an opening in a face plate 274 secured to the casing 262. In operation, a chamber 276 is successively evacuated to successively actuate the piston 264 to rotate the drum 272, thus advising the driver of the then existing transmission setting.

There are disclosed in Figures 13 and 14 alternative types of vacuum operated telltale mechanism. For example, Figure 13 discloses such a mechanism wherein an indicator wheel 278 is pivotally mounted to a cylinder 280 and is arranged to be rotated by a spring pressed rack 282, the latter being pivotally secured to a spring and vacuum operated piston 284. Figure 14 discloses, in general, a similar type of mechanism wherein a spring and vacuum operated piston 286 is operatively connected to indicator drum 278 by means of rack 282. A pin 288, secured to the piston 286, projects therefrom and is adapted to seat within a recess 290 in the base of the cylinder 280, said pin serving both as a stop member and as a guide for the piston.

There is disclosed in Figure 15 another embodiment of two-speed rear axle control mechanism wherein a double-acting motor 292 is operatively connected to such a transmission by a connecting rod 294. The motor is placed in fluid transmitting connection with an intake manifold 296 by conduits 298, 300 and 302, a three-way pilot valve 304, operated by an accelerator 306 and throttle link 308, and a foot operated double three-way selector valve 310 functioning to control the operation of the motor. If desired, a clutch operating motor 312 may be made a part of said mechanism, said motor being connected to the manifold 296 by means of a conduit 314 tapped into the conduit 298 between the selector valve 310 and pilot valve 304, whereby the pilot valve serves to control the operation of the motor. As with the previously described power mechanism, the construction is such that the clutch is disengaged prior to an operation of the two-speed rear axle unit.

Describing the operation of the aforementioned mechanism, upon release of the accelerator, the pilot valve 304 is operated to place the motors 292 and 312 in communication with the manifold to first disengage the clutch and then operate or permit an operation of the transmission. The essence of the instant invention lies in the selector valve mechanism 310 and the control means therefor.

Referring to Figures 16 and 17, the spring returned heel operated plunger 310 is secured to a cross head 316 to which are pivotally secured two spring connected pawl members 318 and 320. The pawls are adapted to interlock with a ratchet 322 secured to a barrel-shaped valve member 324 rotatably housed within a valve casing 326 secured to the chassis.

Should the driver desire to operate the transmission unit to change the setting thereof, he has merely to depress with his heel the plunger 328, thus rotating the ratchet 322 and its connected valve member 324. As disclosed in Figure 17, the valve member 330 is recessed to cooperate with ports 332, 334, 336 and 338 in the valve casing 326 providing in effect a double three-way valve construction. Successive operations of the plunger 328 serve to connect first one and then the other of the end compartments of the motor 292 with the manifold to thus successively establish the transmission 20 in its high and low gear settings.

There is thus provided an efficient clutch and transmission operating power mechanism, whereby the conventional clutch pedal and gear shift lever are dispensed with. The driver has merely to select or preselect one of three operations of the transmission, said operation being followed by an operation of the accelerator and/or an operation of the two-speed rear axle control valve. The accelerator operated valve provides a master control or interlock, whereby the accelerator must be released in order to effect said transmission operation together with an operation of the clutch. Any one of four forward speeds may be selected or preselected, depending upon whether the selector valves are operated before or after the accelerator is released: said speeds may be defined as low-low, high-low, low-high and high-high.

An important feature of the invention lies in so proportioning, constructing and arranging the mechanism that the clutch is always disengaged prior to an operation of either of the transmission mechanisms. This may be accomplished in many ways, e. g., by so proportioning the internal diameter of the conduits 82, 116, etc., leading to the clutch and transmission operating motors as to insure an operation of the clutch motor 40 prior to an operation of the transmission motor 32. This end may also be accomplished by inserting a restricting valve in the conduit 116. As a further feature of the invention, the power mechanism is particularly adaptable to either front or rear engine mount constructions, for the selector valves may be conveniently placed in the driver's compartment and the governor and relay units positioned adjacent the transmissions and clutch wherever they may be located upon the chassis.

It will be understood that while the illustrated embodiments of the invention are described as shown, a considerable latitude is to be permitted in construction within the scope of the appended claims.

We claim:

1. In an automotive vehicle provided with a plurality of transmissions, an accelerator, a clutch and an ignition system, power means for operating said transmission and clutch, and means controlled in part by said ignition system and accelerator for controlling the operation of said power means.

2. In an automotive vehicle provided with a plurality of transmissions, an accelerator, a clutch and an ignition system, power means for operating said transmissions and clutch, and means controlled in part by said ignition system and accelerator for controlling the operation of said power means, said second-mentioned means including a master valve operated by the accelerator.

3. In an automotive vehicle provided with a plurality of transmissions, an accelerator, a clutch and an ignition system, power means for operating said transmissions and clutch, and means controlled in part by said ignition system and accelerator for controlling the operation of said power means, said second-mentioned means including a plurality of selector valves.

4. In an automotive vehicle provided with a plurality of transmissions, an accelerator, a clutch and an ignition system, power means for operating said transmissions and clutch, and means controlled in part by said ignition system and accelerator for controlling the operation of said power means, said power means including a double-acting motor for operating one of said transmissions and a second double-acting motor for operating another of said transmissions.

5. In an automotive vehicle provided with an ignition switch, an accelerator, a clutch, a propeller shaft, a change-speed transmission interposed between said clutch and shaft, driving wheels, and a second change-speed transmission interposed between said shaft and wheels, power means for operating said clutch and transmissions comprising a plurality of motors, one motor for operating each of said transmissions, and a motor for operating the clutch, and means, operated in part by said accelerator and in part by said ignition switch, for controlling the operation of said power means.

6. In an automotive vehicle provided with two transmissions, a clutch, an ignition system, a speed-responsive mechanism, and an accelerator, power means for operating both transmissions and the clutch, and means for controlling the operation of said power means comprising an accelerator operated master valve, an ignition switch, and a selector valve operated by said speed-responsive mechanism.

7. In an automotive vehicle provided with an internal-combustion engine, two transmissions, a clutch, an ignition system, a speed-responsive mechanism, and an accelerator, power means for operating both transmissions and the clutch, and deriving its motive power from said engine, and valve and switch means for controlling the operation of said power means comprising an accelerator operated master valve, an ignition switch, and a selector valve operated by said speed-responsive mechanism.

8. In an automotive vehicle provided with an intake manifold, an accelerator, a speed-responsive mechanism, two change-speed transmissions, and a clutch, power means for operating the clutch and transmissions, said power means comprising a separate motor for operating each of said transmissions, and a motor for operating the clutch, and further comprising fluid transmitting connections, which, together with the remainder of the power means, are so constructed and so interconnect said motors with the manifold as to insure a disengagement of the clutch prior to an operation of the transmissions, said power means further including an accelerator operated master valve and a plurality of selector valves, one of said selector valves being operated by said speed-responsive mechanism.

9. In an automotive vehicle provided with an accelerator, a speed-responsive mechanism, a change-speed transmission, and a clutch, power means for operating said transmission and clutch comprising a double-ended motor operably connected to the transmission, and a motor operably connected to the clutch, and valvular means for controlling the operation of said power means comprising an accelerator operated master valve, a manually operable selector valve, and a second selector valve operated by said speed-responsive mechanism.

10. In an automotive vehicle provided with an accelerator, a governor, and a change-speed transmission, power means for operating said transmission including a pressure differential operated motor, and control valves therefor including a manually operable selector valve, an accelerator operated valve, and a governor controlled valve, together with a telltale mechanism rendered operative after an operation of said selector valve, and operable to advise of the gear ratio setting of the transmission, said telltale mechanism comprising a vacuum and spring operated motor rendered operable with each operation of said selector valve.

GEORGE F. HOUSTON.
ROY S. SANFORD.